(12) United States Patent
Saito

(10) Patent No.: US 12,075,172 B2
(45) Date of Patent: Aug. 27, 2024

(54) PHOTOELECTRIC CONVERSION APPARATUS AND EQUIPMENT

(71) Applicant: CANON KABUSHIKI KAISHA, Tokyo (JP)

(72) Inventor: Makiko Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 18/078,248

(22) Filed: Dec. 9, 2022

(65) Prior Publication Data

US 2023/0188868 A1 Jun. 15, 2023

(30) Foreign Application Priority Data

Dec. 13, 2021 (JP) .................. 2021-201993

(51) Int. Cl.
*H04N 25/60* (2023.01)
*H04N 25/76* (2023.01)
*H04N 25/78* (2023.01)

(52) U.S. Cl.
CPC ......... *H04N 25/60* (2023.01); *H04N 25/7795* (2023.01); *H04N 25/78* (2023.01)

(58) Field of Classification Search
CPC .. H04N 25/60; H04N 25/772; H04N 25/7795; H04N 25/78
See application file for complete search history.

(56) References Cited

U.S. PATENT DOCUMENTS

| 9,509,931 | B2 | 11/2016 | Kobayashi et al. |
| 9,955,092 | B2 | 4/2018 | Saito et al. |
| 11,303,830 | B2 | 4/2022 | Kumagai |
| 2011/0157442 | A1 | 6/2011 | Itakura et al. |
| 2015/0062393 | A1* | 3/2015 | Komaba ............ H04N 25/772 348/308 |
| 2015/0304586 | A1* | 10/2015 | Kishi .................. H04N 25/778 348/302 |
| 2017/0289479 | A1* | 10/2017 | Iseki .................... H04N 25/745 |

FOREIGN PATENT DOCUMENTS

| JP | 2009-033381 A | 2/2009 |
| JP | 2015-198365 A | 11/2015 |
| JP | 2015-216625 A | 12/2015 |
| JP | 2021-057832 A | 4/2021 |
| JP | 2021-064859 A | 4/2021 |

* cited by examiner

*Primary Examiner* — Daniel M Pasiewicz
(74) *Attorney, Agent, or Firm* — Venable LLP

(57) ABSTRACT

A photoelectric conversion apparatus includes A/D conversion circuits configured to generate digital data by A/D-converting, during an A/D conversion period, analog signals read out from pixel circuits; memory circuits configured to store the digital data, output circuits each connected to at least two memory circuits among the memory circuits, and a scanning circuit configured to select one of the output circuits and select one of the at least two memory circuits connected to the selected output circuit, thereby reading out the digital data. The scanning circuit is configured not to change the selection of the output circuit during a prohibition period including at least a period until 0.65T elapses after a lapse of 0.35T since a start of the A/D conversion period where T represents a length of the A/D conversion period.

14 Claims, 11 Drawing Sheets

PHOTOELECTRIC CONVERSION APPARATUS AND EQUIPMENT

BACKGROUND OF THE INVENTION

Field of the Invention

The present invention relates to a photoelectric conversion apparatus and equipment.

Description of the Related Art

There are proposed various techniques for reading out data from a photoelectric conversion apparatus at high speed. Japanese Patent Laid-Open No. 2015-198365 proposes a photoelectric conversion apparatus including an A/D conversion circuit and a memory circuit for each pixel column. Analog signals from the next pixel row are A/D-converted while reading out digital data from the memory circuits, thereby speeding up data readout. The plurality of memory circuits are divided into a plurality of blocks, and two or more memory circuits included in each block are connected to a common output circuit. A horizontal scanning circuit selects one of the plurality of output circuits, and selects one of the two or more memory circuits connected to the selected output circuit, thereby reading out digital data from the selected memory circuit to a data output line.

SUMMARY OF THE INVENTION

In the photoelectric conversion apparatus described in Japanese Patent Laid-Open No. 2015-198365, to change the selected state of the output circuit, two or more memory circuits are connected or disconnected to or from the corresponding data output line. A power fluctuation caused by the change of the connection state may influence an A/D conversion operation. According to an aspect of the present disclosure, the accuracy of A/D conversion is improved.

According to an embodiment, a photoelectric conversion apparatus is provided. The apparatus comprises a plurality of pixel circuits, a plurality of A/D conversion circuits configured to generate digital data by A/D-converting, during an A/D conversion period, analog signals read out from the plurality of pixel circuits, a plurality of memory circuits configured to store the digital data generated by the plurality of A/D conversion circuits, a plurality of output circuits each connected to at least two memory circuits among the plurality of memory circuits, and a scanning circuit configured to select one of the plurality of output circuits, and select one of the at least two memory circuits connected to the selected output circuit, thereby reading out, to an output line, the digital data stored in the selected memory circuit. The scanning circuit is configured not to change the selection of the output circuit from the plurality of output circuits during a prohibition period including at least a period until 0.65T elapses after a lapse of 0.35T since a start of the A/D conversion period where T represents a length of the A/D conversion period.

Further features of the present invention will become apparent from the following description of exemplary embodiments with reference to the attached drawings.

DESCRIPTION OF THE EMBODIMENTS

Figure 1:
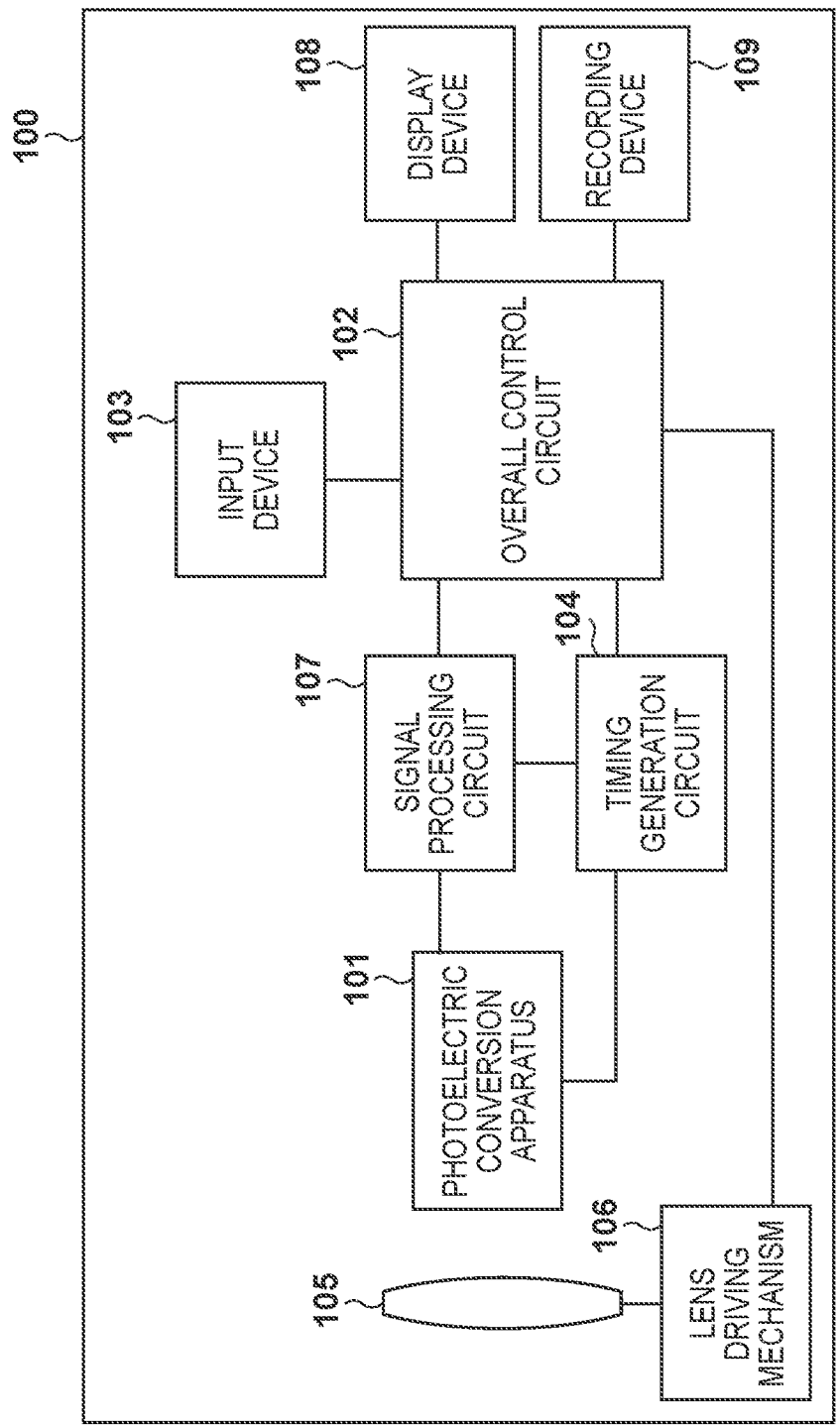
FIG. 1 is a block diagram showing an example of the arrangement of an image capturing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A photoelectric conversion apparatus to be described below can be an image sensor (for example, a CMOS image sensor) for performing image capturing. The photoelectric conversion apparatus is not limited to the image sensor for performing image capturing, and is applicable to other examples. Other examples include a distance measuring apparatus (an apparatus for, for example, distance measurement using focus detection or Time of Flight (TOF)), and a photometric apparatus (an apparatus for, for example, measuring an incident light amount).

First Embodiment

An example of the arrangement of an image capturing apparatus 100 according to the first embodiment will be described with reference to FIG. 1. The image capturing apparatus 100 includes, for example, constituent elements shown in FIG. 1. A photoelectric conversion apparatus 101 includes a pixel region in which a plurality of pixel circuits are two-dimensionally arranged, and can output image capturing signal data corresponding to incident light. The detailed arrangement of the photoelectric conversion apparatus 101 will be described later. An overall control circuit 102 controls the operation of each constituent element of the image capturing apparatus 100. The overall control circuit 102 also performs, for the image capturing signal data, signal processing such as developing and compression for generating a recording/reproduction image. An input device 103 accepts an imaging execution instruction or an input concerning the driving mode setting of the image capturing apparatus 100, which is externally input by a user or the like to the overall control circuit 102.

In accordance with a control signal from the overall control circuit 102, a timing generation circuit 104 generates a timing signal for driving the photoelectric conversion apparatus 101 and a signal processing circuit 107. An imaging lens 105 causes the photoelectric conversion apparatus 101 to form an optical image of an object. The imaging lens 105 may or may not be detachable from the main body of the image capturing apparatus 100. A lens driving mechanism 106 drives the imaging lens 105 and, more specifically, executes focus control, zoom control, aperture control, or the like in accordance with a control signal from the overall control circuit 102. The signal processing circuit 107 performs signal processing such as correction for the image capturing signal data output from the photoelectric conversion apparatus 101.

A display device 108 displays information such as a reproduction image or the driving mode setting of the image capturing apparatus 100. A recording device 109 includes a recording medium (not shown), and records image data for recording. As the recording medium, for example, a semiconductor memory such as a flash memory is used. The recording medium may or may not be detachable from the recording device 109.

Figure 2:
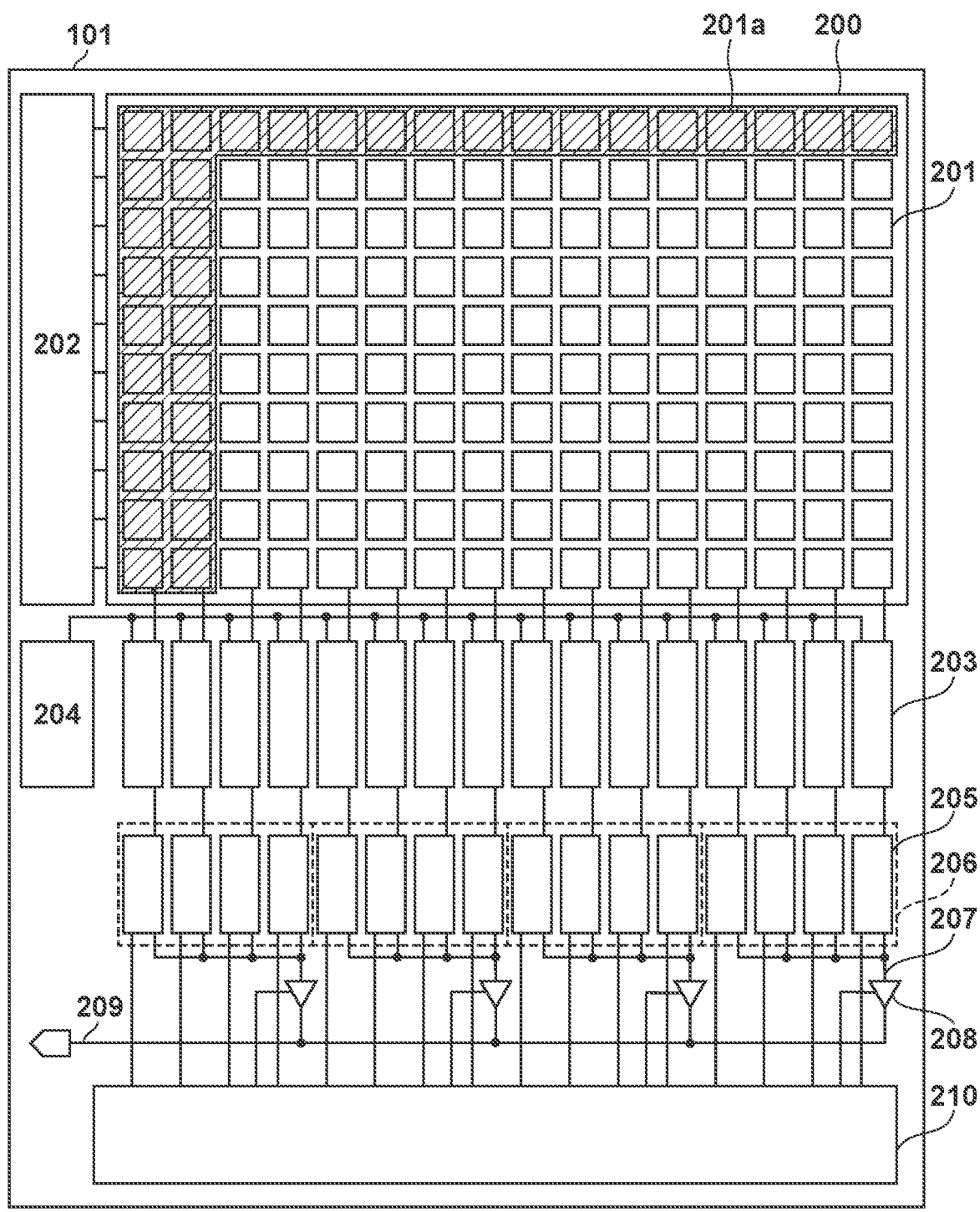
FIG. 2 is a block diagram showing an example of the arrangement of a photoelectric conversion apparatus according to the first embodiment.

An example of the arrangement of the above-described photoelectric conversion apparatus 101 will be explained with reference to FIG. 2. In a pixel region 200, a plurality of pixel circuits 201 are arranged in a matrix. In this embodiment, for the sake of simplicity, FIG. 2 shows an example in which the pixel circuits 201 of 10 rows×16 columns are included. However, the number of rows and the number of columns of the pixel circuits 201 are not limited to them. Each pixel circuit 201 includes a photoelectric conversion unit, and can output, as a pixel signal, an analog signal corresponding to incident light. Furthermore, the pixel circuit 201 can output an analog signal in the case of a reset state. In the pixel region 200, the pixel circuits 201 included in the uppermost row and the left two columns (a hatched portion in FIG. 2) are optical black (OB) pixel circuits 201a which are shielded from light. The output from the OB pixel circuit 201a is used to correct the signal of another pixel circuit 201.

A vertical scanning circuit 202 controls a timing of reading out pixel signals for each row with respect to the pixel region 200. A plurality of column circuits 203 are provided in correspondence with the plurality of pixel columns of the pixel region 200. In the example shown in FIG. 2, 16 column circuits 203 are provided in correspondence with the 16 pixel columns, and the pixel columns and the column circuits 203 are arranged in one-to-one correspondence. Each column circuit 203 includes an analog-to-digital (A/D) conversion circuit. The A/D conversion circuit generates digital data by A/D-converting the analog signal read out from the pixel circuit 201 of each pixel column. A counter circuit 204 is commonly provided for the plurality of column circuits 203. A count signal output from the counter circuit 204 is referred to by the A/D conversion circuit of the column circuit 203, and used for A/D conversion.

A plurality of memory circuits 205 are provided in correspondence with the plurality of column circuits 203. In the example shown in FIG. 2, the column circuits 203 and the memory circuits 205 are arranged in one-to-one correspondence. Each memory circuit 205 temporarily stores the digital data generated by the A/D conversion circuit of the column circuit 203. By providing the memory circuit 205 in correspondence with the column circuit 203, it is possible to output the digital data from the memory circuit 205 simultaneously with the A/D conversion operation of the pixel signal in the column circuit 203. The plurality of memory circuits 205 are divided into a plurality of memory blocks 206. In the example shown in FIG. 2, the memory circuits 205 for four columns form one memory block 206.

For each of the plurality of memory blocks 206, a block digital output line 207 is provided. Signal data held in the memory circuit 205 is output via the block digital output line 207 of the corresponding memory block 206. For each of the plurality of block digital output lines 207, an output circuit 208 is provided. The output circuit 208 is provided between the block digital output line 207 and a common digital output line 209, and is used to control, for each memory block 206, the electrical connection state between the common digital output line 209 and the block digital output line 207. One output circuit 208 is connected, via the block digital output line 207, to two or more (four in the example of FIG. 2) memory circuits 205 included in the corresponding memory block 206. The digital data is output to the outside of the photoelectric conversion apparatus 101 via the common digital output line 209. A horizontal scanning circuit 210 controls the electrical connection state between the common digital output line 209 and the block digital output line 207 by the output circuit 208 and the output timing of each memory circuit 205.

Figure 3:
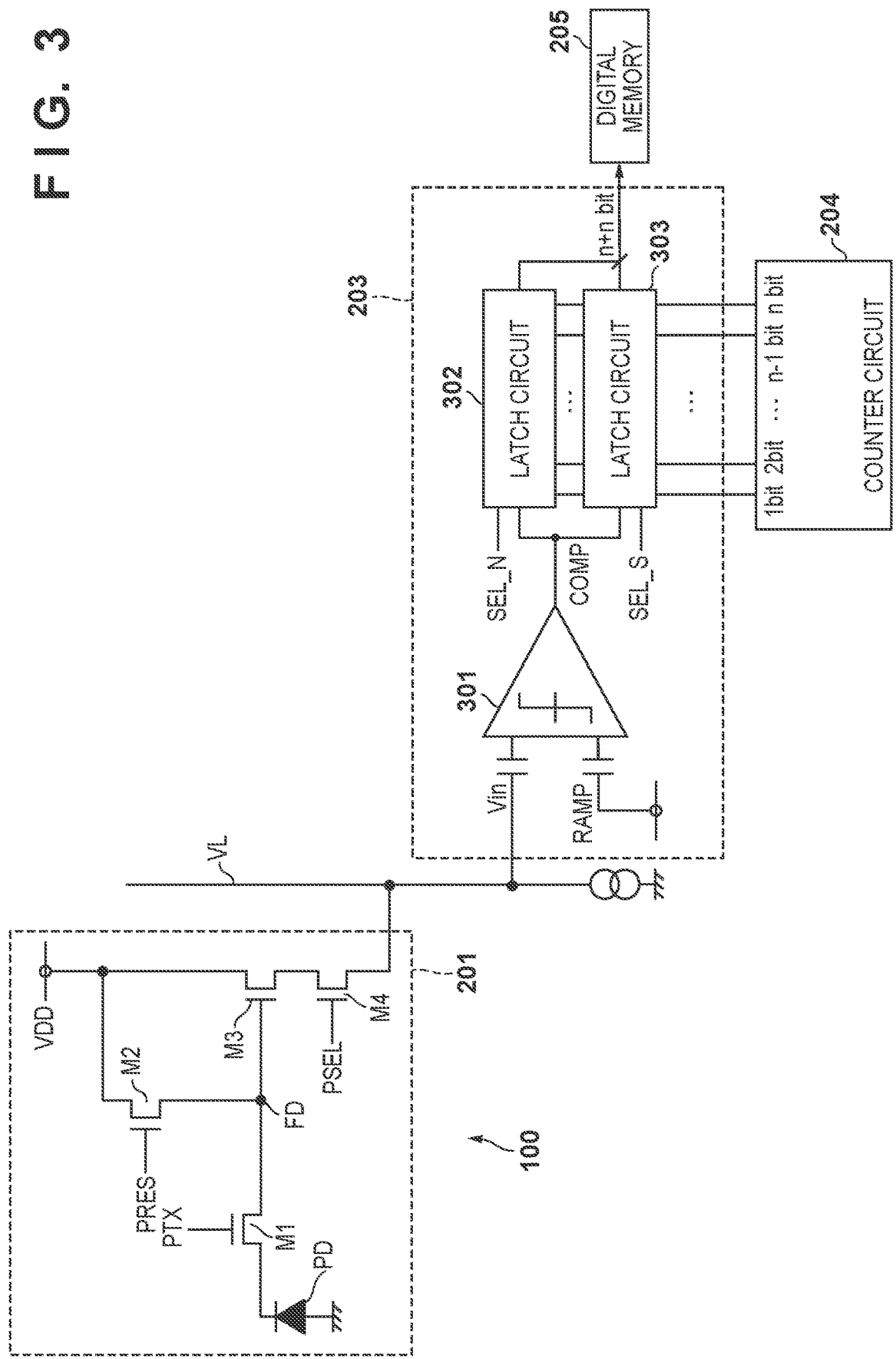
FIG. 3 is an equivalent circuit diagram showing an example of the arrangement of a pixel circuit and a column circuit according to the first embodiment.

An example of the circuit arrangement of the pixel circuit 201 and the column circuit 203 will be described with reference to FIG. 3. The pixel circuit 201 includes a photodiode PD. The photodiode PD functions as a photoelectric conversion unit, and can accumulate charges corresponding to incident light. The pixel circuit 201 also includes a transfer transistor M1, a reset transistor M2, a floating diffusion FD, an amplification transistor M3, and a selection transistor M4. The floating diffusion FD can operate as a charge holding unit. A control signal is input from the vertical scanning circuit 202 to each of the gates of the transistors M1 to M4. Each of the transistors M1 to M4 is in an ON state while the control signal is at high level, and is in an OFF state while the control signal is at low level. Each control signal is commonly input for each pixel row of the pixel region 200, and the pixel circuits 201 arranged in the same pixel row are simultaneously driven by the common control signal.

The transfer transistor M1 is controlled by a control signal PTX. While the transfer transistor M1 is in the ON state, charges accumulated in the photodiode PD are transferred to the floating diffusion FD. The reset transistor M2 is controlled by a control signal PRES. When the reset transistor M2 is set in the ON state, the potential of the floating diffusion FD is reset by a power supply potential VDD. By simultaneously setting the control signals PRES and PTX in the ON state, the charges accumulated on the photodiode PD can be reset. The selection transistor M4 is controlled by a control signal PSEL. A signal voltage amplified and converted by the amplification transistor M3 in accordance with the charge amount of the floating diffusion FD is transmitted as a pixel signal to a vertical output line VL while the amplification transistor M3 is in the ON state.

The column circuit 203 includes an A/D conversion circuit. In the example shown in FIG. 3, a slope A/D conversion circuit is provided as the A/D conversion circuit.

Instead of this, another A/D conversion circuit such as a successive approximation type A/D conversion circuit may be used. A/D conversion circuit includes a comparator 301 and latch circuits 302 and 303. The signal voltage input from the pixel circuit 201 via the vertical output line VL is input to the comparator 301. The comparator 301 compares an input signal Vin with a reference signal RAMP, and outputs a comparison result as a comparison signal COMP. The reference signal RAMP is a ramp voltage generated by a ramp generation circuit (not shown), and is commonly supplied to the comparator 301 of each column. The comparator 301 compares the magnitude of the input signal Vin with that of the reference signal RAMP. If the input signal Vin is smaller than the reference signal RAMP, the comparator 301 outputs a low-level signal as the comparison signal COMP, and if the input signal Vin is larger than the reference signal RAMP, the comparator 301 outputs a high-level signal as the comparison signal COMP.

The comparison signal COMP and data of a plurality of bits indicating the count value supplied from the counter circuit 204 are input to each of the latch circuits 302 and 303. A selection signal SEL_N is also input to the latch circuit 302. While the selection signal SEL_N is at high level, the latch circuit 302 accepts the input of the comparison signal COMP. At a timing of switching the comparison signal COMP from high level to low level, the latch circuit 302 latches, as signal data, each bit data of the count value input from the counter circuit 204. A selection signal SEL_S is input to the latch circuit 303. While the selection signal SEL_S is at high level, the latch circuit 303 accepts the input of the comparison signal COMP. At a timing of switching the comparison signal COMP from high level to low level, the latch circuit 303 latches, as signal data, each bit data of the count value input from the counter circuit 204. In the example shown in FIG. 3, n-bit data is output as the count value from the counter circuit 204, and each of the latch circuits 302 and 303 is configured to latch the n-bit data. Instead of this, the number of bits of data that can be latched may be different for each of the latch circuits 302 and 303.

Figure 4:
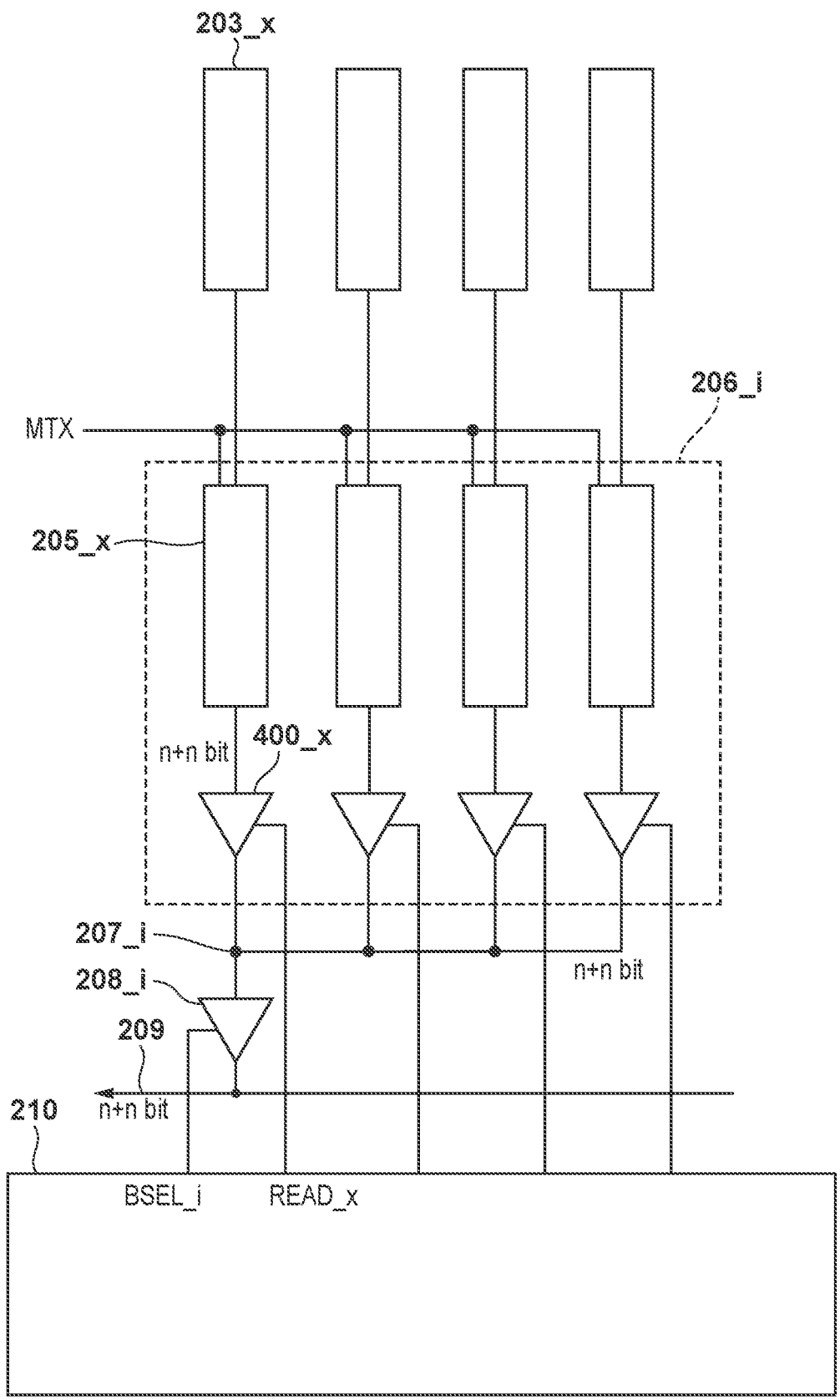
FIG. 4 is a block diagram showing an example of the arrangement of a memory block and its peripheral circuits according to the first embodiment.

An example of the arrangement from the memory circuit 205 to the common digital output line 209 will be described with reference to FIG. 4. In the example shown in FIG. 4, each memory block 206 includes the memory circuits 205 for four pixel columns. When referring to a specific one of the plurality of column circuits 203, a subscript x is added to represent a column circuit 203_x. When referring to a specific one of the plurality of memory circuits 205, the subscript x is added to represent a memory circuit 205_x. When referring to a specific one of the plurality of memory blocks 206, a subscript i is added to represent a memory block 206_i. When referring to a specific one of the plurality of block digital output lines 207, the subscript i is added to represent a block digital output line 207_i. When referring to a specific one of the plurality of output circuits 208, the subscript i is added to represent an output circuit 208_i. The subscript x indicates an element corresponding to the xth pixel column, and is an integer of 1 (inclusive) to the number of pixel columns (inclusive). The subscript i indicates an element corresponding to the ith memory block, and is an integer of 1 (inclusive) to (the number of pixel columns/4) (inclusive).

The memory circuit 205_x holds each of the bit data output from the latch circuits 302 and 303 of the column circuit 203_x in accordance with a memory transfer signal MTX commonly given to each pixel column. A column selection circuit 400_x is connected to the output terminal of the memory circuit 205_x. The column selection circuit 400_x connects the memory circuit 205_x to the block digital output line 207_i in accordance with a readout signal READ_x input from the horizontal scanning circuit 210 for each column. The block digital output line 207_i is provided for each memory block 206_i, and can transmit each of bit data from connected digital memories.

The output circuit 208_i connects the block digital output line 207_i to the common digital output line 209 while a block selection signal BSEL_i input from the horizontal scanning circuit 210 for each memory block is at high level. The common digital output line 209 is commonly provided for the plurality of memory blocks 206, and can transmit each bit data of the memory block 206_i connected via the output circuit 208_i.

Figure 5:
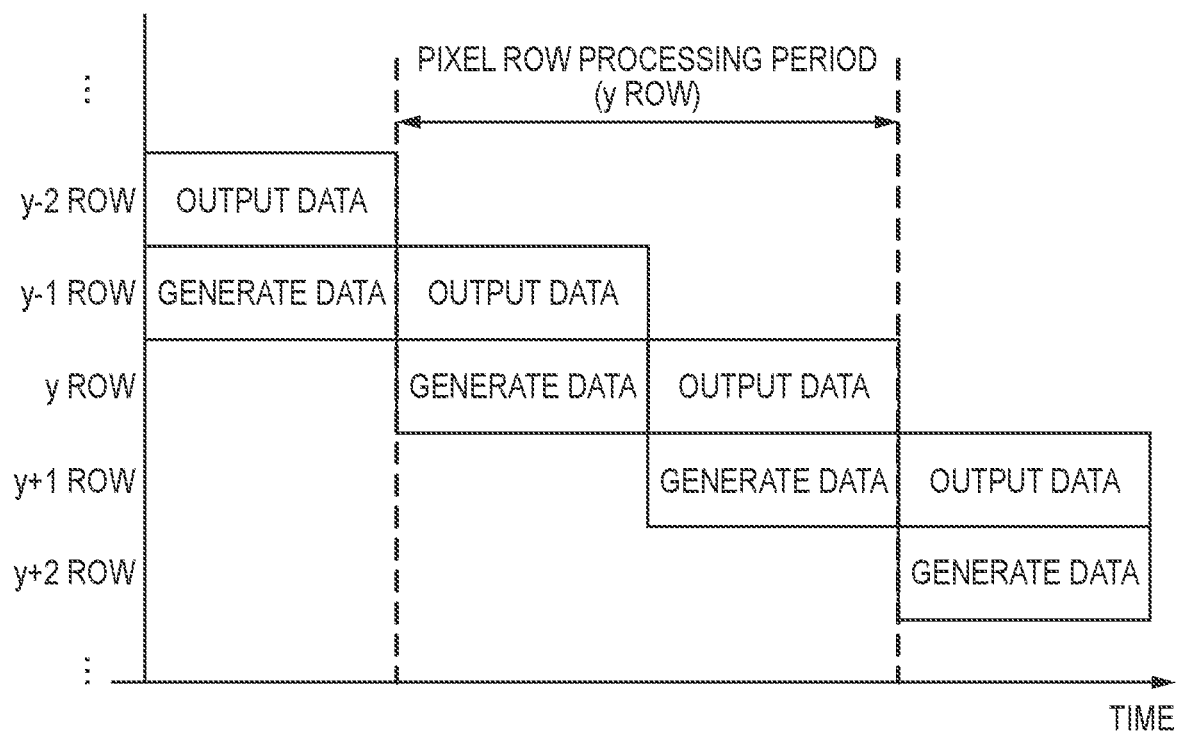
FIG. 5 is a timing chart showing an overview of an example of the operation of the photoelectric conversion apparatus according to the first embodiment.

An example of an operation of reading out digital data from the photoelectric conversion apparatus 101 will be described with reference to FIGS. 5 and 6. FIG. 5 shows the temporal relationship among operations in the respective pixel rows with respect to a specific pixel row (to be referred to as a yth row hereinafter) and the preceding and succeeding pixel rows. Processing for one pixel row includes a data generation operation of generating digital data corresponding to the analog signal read out from each pixel circuit 201 and a data output operation of externally outputting the generated digital data. In the data generation operation, digital data are simultaneously generated with respect to the plurality of pixel circuits 201 included in the same pixel row. In the data output operation, the digital data are sequentially output with respect to the plurality of pixel circuits 201 included in the same pixel row. The photoelectric conversion apparatus 101 is configured so that the data generation operation for the yth pixel row and the data output operation for the (y−1)th pixel row temporally overlap each other. Furthermore, the photoelectric conversion apparatus 101 is configured so that the data generation operation for the (y+1)th pixel row and the data output operation for the yth pixel row temporally overlap each other.

Details of the data generation operation including A/D conversion of the pixel signal and the data output operation from the memory circuit 205 will be described with reference to FIG. 6. During a period from time T00 to time T10, the data generation operation for the pixel circuits 201 in the yth row is indicated. During a period from time T11 to time T14, the data output operation from the memory circuits 205 for the pixel circuits 201 in the yth row is indicated. During the period from time T00 to T10, simultaneously with the data generation operation for the pixel circuits 201 in the yth row, the data output operation for the pixel circuits 201 in the (y−1)th row is performed. During the period from time T11 to time T14, simultaneously with the data generation operation for the pixel circuits 201 in the (y+1)th row, the data output operation for the pixel circuits 201 in the yth row is performed. The levels of the control signals PSEL, PRES, and PTX are switched at timings different for each pixel row. A subscript is added to the control signals supplied to the pixel circuits 201 in each pixel row, thereby discriminating the control signals. For example, the control signal PSEL supplied to the pixel circuits 201 in the yth row is represented by PSEL_y.

The data generation operation for the pixel circuits 201 in the yth row is started at time T00 by switching the control signal PSEL_y to high level. This sets, in the ON state, the selection transistors M4 of the pixel circuits 201 in the yth row, thereby connecting the amplification transistors M3 to the vertical output line VL.

At time T01, the control signal PRES_y is switched to low level, and thus the reset transistors M2 transition to the OFF state to cancel the reset of the floating diffusions FD. After that, at time T02 after a lapse of a predetermined time, the A/D conversion operation for the reset level of the pixel is started. The interval between time T01 and time T02 is set to an expected length during which the voltage of the vertical output line VL is stabilized after the reset is canceled.

The A/D conversion operation is started by starting supply of the ramp signal RAMP to the comparator 301 of each A/D conversion circuit. The ramp signal RAMP is a signal whose voltage level changes with time at a predetermined ratio. At the start of the supply of the ramp signal RAMP, the counter circuit 204 starts counting from time T02 to count the time during which the ramp signal RAMP is supplied. At the start of the supply of the ramp signal RAMP and counting by the counter circuit 204, the selection signal SEL_N is switched to high level. This causes the latch circuit 302 to start accepting the input of the comparison signal COMP.

The comparator 301 compares the magnitude of the voltage level of the input voltage Vin input via the vertical output line VL with that of the voltage level of the ramp signal RAMP. At this time, the input voltage Vin is stable at a voltage level based on the reset level of the floating diffusion FD of the pixel circuit 201. The input voltage Vin at this time is the analog signal read out from the pixel circuit 201 in the reset state. Such analog signal will be referred to as an N signal hereinafter. If the voltage level of the ramp signal RAMP lowers with time, and becomes lower than the input voltage Vin, the comparison signal COMP is switched to low level. This time is represented by T03. In accordance with the change of the comparison signal COMP to low level, the latch circuit 302 latches each bit data of the count value of the counter circuit 204. This latched digital data represents the N signal read out from the pixel circuit 201. The digital data representing the N signal will be referred to as N signal data hereinafter.

At time T04, the supply of the ramp signal RAMP to the comparator 301 of each A/D conversion circuit ends. This ends the A/D conversion operation of the N signal of each pixel circuit 201. At the end of the supply of the ramp signal RAMP to the comparator 301 of each A/D conversion circuit, the selection signal SEL_N is switched to low level. This stops acceptance of the comparison signal COMP by the latch circuit 302. At the end of the supply of the ramp signal RAMP to the comparator 301 of each A/D conversion circuit, the counter circuit 204 stops counting. The ramp signal RAMP and the counter circuit 204 are reset before the next A/D conversion operation.

The control signal PTX_y is switched to high level at time T05, and maintained at high level until time T06. This transfers signal charges accumulated in the photodiode PD to the floating diffusion FD. In the photodiode PD, charges corresponding to the amount of light entering the pixel circuit 201 (more specifically, the photodiode PD) from the end of the preceding readout operation until now are accumulated. The potential of the floating diffusion FD changes in accordance with the charge amount transferred from the photodiode PD. Accordingly, the voltage level of the input voltage Vin is changed to a voltage level based on the potential of the floating diffusion FD. The input signal Vin at this time is the analog signal read out from the pixel circuit 201 in the state in which charges corresponding to incident light are accumulated. This analog signal will be referred to as an S signal hereinafter. The S signal has such value that an optical signal level overlaps the reset level of the pixel circuit 201. If no light enters the photodiode (for example, with respect to the OB pixel circuit 201a), the S signal has a value almost equal to that of the N signal, as indicated by a broken line in FIG. 6.

At time T06, the control signal PTX_y is switched to low level. This ends transfer of the signal charges from the photodiode PD. Simultaneously with this, the A/D conversion operation for the input voltage Vin is started again. The A/D conversion operation started from time T06 is the same as the above-described one started from time T02. However, in this A/D conversion operation, the selection signal SEL_S is switched to high level at the start of the A/D conversion operation to hold the result in the latch circuit 302. If no light enters the photodiode PD (for example, with respect to the OB pixel circuit 201a), a time at which the comparison signal COMP is inverted is represented by T07a. Alternatively, a time at which the comparison signal COMP is inverted by the incidence of some light amount is represented by T07b. At this time, the latched digital data represents the S signal read out from the pixel circuit 201. The digital data representing the S signal will be referred to as S signal data hereinafter.

At time T08, the supply of the ramp signal RAMP to the comparator 301 of each A/D conversion circuit ends. This ends the A/D conversion operation of the S signal of each pixel circuit 201. At the end of the supply of the ramp signal RAMP to the comparator 301 of each A/D conversion circuit, the selection signal SEL_S is switched to low level. This stops acceptance of the comparison signal COMP by the latch circuit 303. At the end of the supply of the ramp signal RAMP to the comparator 301 of each A/D conversion circuit, the counter circuit 204 stops counting. The ramp signal RAMP and the counter circuit 204 are reset before the next A/D conversion operation.

At time T09, the control signal PRES_y is switched to high level. This causes the reset transistors M2 to transition to the ON state to start reset of the floating diffusions FD. At time T10, the control signal PSEL_y is switched to low level. This sets, in the OFF state, the selection transistors M4 of the pixel circuits 201 in the yth row, and connection of each amplification transistor M3 to the vertical output line VL is disconnected. As described above, when the control signal PSEL_y is switched to low level, the data generation operation for the pixel circuits 201 in the yth row ends.

Figure 6:
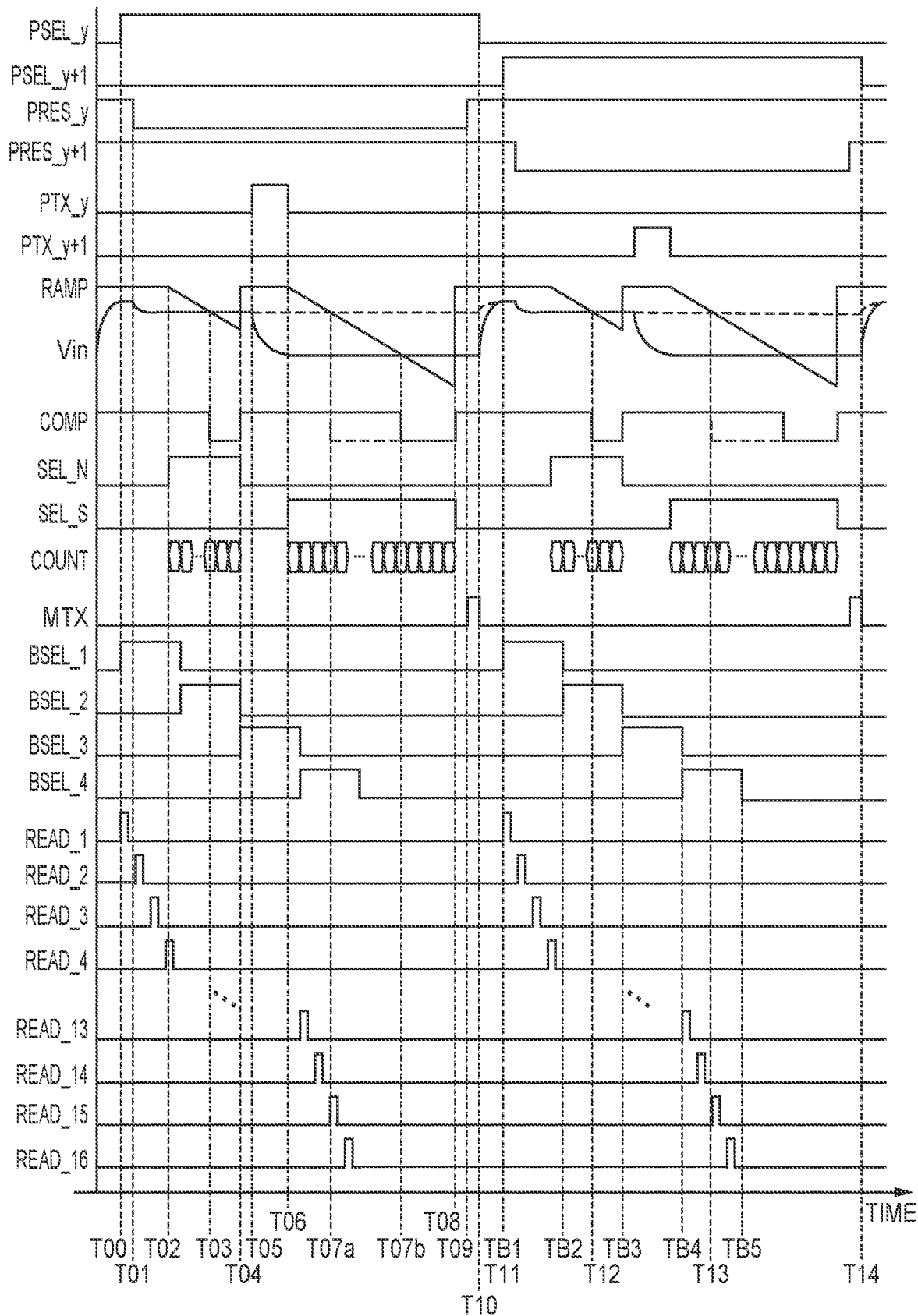
FIG. 6 is a timing chart showing details of the example of the operation of the photoelectric conversion apparatus according to the first embodiment.

After the end of the A/D conversion operation for the S signal, at an arbitrary timing during a period from time T08 to time T11, the memory transfer signal MTX supplied to each memory circuit 205 is temporarily (during a period from time T09 to time T10 in the example shown in FIG. 6) switched to high level. This stores, in each corresponding memory circuit 205, the N signal data latched by the latch circuit 302 and the S signal data latched by the latch circuit 303. The N signal data and the S signal data will collectively be referred to as signal data hereinafter.

After the signal data with respect to the pixel circuits 201 in the yth row are stored in the memory circuits 205, the data output operation for the pixel circuits 201 in the yth row is started at T11. More specifically, the digital data stored in the memory circuits 205 are output to the outside (for example, the signal processing circuit 107 shown in FIG. 1) of the photoelectric conversion apparatus 101 via the common digital output line 209.

During a period from time TB1 to time TB2, a block selection signal SEL_1 is at high level. This selects a memory block 206_1 to connect a block digital output line 207_1 to the common digital output line 209. While the block selection signal SEL_1 is at high level, readout signals READ_1 to READ_4 are sequentially sent and memory circuits 205_1 to 205_4 are sequentially selected. When the memory circuits 205_1 to 205_4 are sequentially connected to the block digital output line 207_1, signal data stored in the memory circuits 205_1 to 205_4 are sequentially output from the common digital output line 209.

Similarly, during a period from time TB2 to time TB3, a memory block 206_2 is selected, and signal data stored in memory circuits 205_5 to 205_8 are sequentially output from the common digital output line 209. During a period from time TB3 to time TB4, a memory block 206_3 is selected, and signal data stored in memory circuits 205_9 to 205_12 are sequentially output from the common digital output line 209. During a period from time TB4 to time TB5, a memory block 206_4 is selected, and signal data stored in memory circuits 205_13 to 205_16 are sequentially output from the common digital output line 209. After digital data are read out from all the memory circuits 205, the data output operation for the pixel circuits 201 in the yth row ends.

The signal data output to the outside of the photoelectric conversion apparatus 101 are processed by the signal processing circuit 107. For example, the signal processing circuit 107 removes noise components contained in the S signal data by subtracting the N signal data from the S signal data, thereby extracting components corresponding the incident light. The function of performing subtraction processing may be implemented by a circuit provided in the photoelectric conversion apparatus 101.

Figure 7:
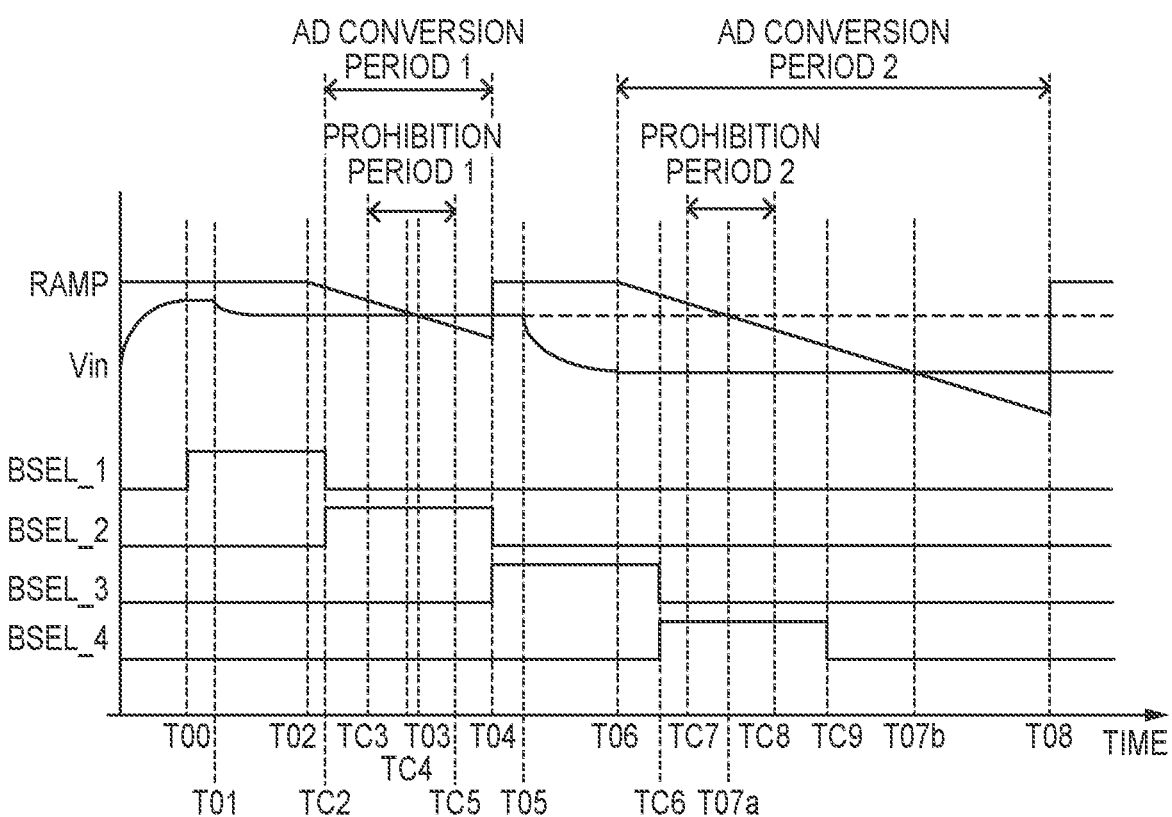
FIG. 7 is a timing chart showing details of the example of the operation of the photoelectric conversion apparatus according to the first embodiment.

Details of the operation of the horizontal scanning circuit 210 will be described with reference to FIG. 7. FIG. 7 is a timing chart obtained by paying attention to some signals and a partial period of the timing chart shown in FIG. 6. As described above, the horizontal scanning circuit 210 selects a specific one of the plurality of output circuits 208 by supplying a control signal BSEL to the plurality of output circuits 208.

If the specific output circuit 208 is selected, the block digital output line 207 connected to the output circuit 208 is connected to the common digital output line 209. If the selection of the specific output circuit 208 is canceled, the block digital output line 207 connected to the output circuit 208 is disconnected from the common digital output line 209. The change of the connection state causes a power fluctuation in the column circuit 203 or the vertical output line VL via a power supply wiring. If such power fluctuation occurs around a point of inversion of the output of the comparator 301 (confirmation of the bit value of the digital data) during the A/D conversion operation, an error unwantedly occurs in a value obtained by A/D conversion. Especially, a signal having a relatively small value like the N signal or the S signal from the OB pixel circuit 201a is readily influenced by such power fluctuation.

The horizontal scanning circuit 210 of this embodiment operates not to change the selection of the output circuit from the plurality of output circuits 208 around a point of inversion of the output of the comparator 301 during the A/D conversion operation for the N signal. The change of the selection of the output circuit 208 includes new selection of the output circuit 208 and cancellation of the selection of the output circuit 208. The output circuit 208 is newly selected by switching, to high level, the control signal BSEL supplied to the output circuit 208. The selection of the output circuit 208 is canceled by switching, to low level, the control signal BSEL supplied to the output circuit 208. A period during which the selection of the output circuit 208 from the plurality of output circuits 208 is not changed will be referred to as a prohibition period hereinafter. That is, the horizontal scanning circuit 210 does not change the selection of the output circuit 208 during the prohibition period, and changes the selection of the output circuit 208 during another period.

The prohibition period of the A/D conversion operation for the N signal will be described. A period during which the A/D conversion operation is performed for the N signal will be referred to as A/D conversion period 1 hereinafter. A prohibition period included in A/D conversion period 1 will be referred to as prohibition period 1. As described above, A/D conversion period 1 may be a period during which the ramp signal changes to perform the A/D conversion operation. The photoelectric conversion apparatus 101 is designed so that the time of inverting the output of the comparator 301 during the A/D conversion operation for the N signal is located at the center of A/D conversion period 1. To do this, time TC4 at the center of A/D conversion period 1 (time T02 to time T04) is included in prohibition period 1. In accordance with the actual value of the N signal, the time of inverting the output of the comparator 301 changes. Prohibition period 1 has a length to some extent.

The center of prohibition period 1 may or may not coincide with the center (time TC4) of A/D conversion period 1 (time T02 to time T04). If T represents the length of A/D conversion period 1, the length of prohibition period 1 may be, for example, 30% or 50% of T. If the length of prohibition period 1 is 30% of T, prohibition period 1 may be a period until 0.65T elapses after a lapse of 0.35T since the start of A/D conversion period 1. If the length of prohibition period 1 is 50% of T, prohibition period 1 may be a period until 0.75T elapses after a lapse of 0.25T since the start of A/D conversion period 1.

As prohibition period 1 is longer, the possibility that the time of inverting the output of the comparator 301 is included in prohibit period 1 is higher. On the other hand, as prohibition period 1 is longer, a period during which the change of the selection of the output circuit 208 is restricted is longer. Therefore, the length of prohibition period 1 is designed in consideration of a tradeoff between the above points. Prohibition period 1 may be shorter than A/D conversion period 1 or may be equal to A/D conversion period 1.

In the example shown in FIG. 7, at time T00, the horizontal scanning circuit 210 switches a control signal BSEL_1 to high level, thereby selecting an output circuit 208_1. After that, at time TC2, the horizontal scanning circuit 210 cancels the selection of the output circuit 208_1 by switching the control signal BSEL_1 to low level, and also selects an output circuit 208_2 by switching a control signal BSEL_2 to high level. After that, prohibition period 1 starts at time TC3, and thus the horizontal scanning circuit 210 does not change the selection of the output circuit 208. More specifically, the horizontal scanning circuit 210 maintains the selected state of the output circuit 208_2.

At time TC5, prohibition period 1 ends. After that, at time T04, the horizontal scanning circuit 210 cancels the selection of the output circuit 208_2 by switching the control signal BSEL_2 to low level, and also selects an output circuit 208_3 by switching a control signal BSEL_3 to high level. In the above-described example, time T03 at which the N signal data is confirmed is included in prohibition period 1.

Subsequently, the prohibition period of the A/D conversion operation for the S signal will be described. A period during which the A/D conversion operation is performed for the S signal will be referred to as A/D conversion period 2 hereinafter. A prohibition period included in A/D conversion period 2 will be referred to as prohibition period 2 hereinafter. As described above, A/D conversion period 2 may be a period during which the ramp signal changes to perform the A/D conversion operation.

As described above, if the value of the analog signal to be VD-converted is large, this is hardly influenced by a power fluctuation. Thus, prohibition period 2 is set in the first half of A/D conversion period 2. The length of prohibition period 2 may be equal to the length of prohibition period 1. The length from the start of A/D conversion period 2 to the start of prohibition period 2 may be equal to the length from the start of A/D conversion period 1 to the start of prohibition period 1. If T represents the length of A/D conversion period 1, the length of prohibition period 2 may be, for example, 30% or 50% of T. If the length of prohibition period 2 is 30% of T, prohibition period 2 may be a period until 0.65T elapses after a lapse of 0.35T since the start of A/D conversion period 2. If the length of prohibition period 2 is 50% of T, prohibition period 2 may be a period until 0.75T elapses after a lapse of 0.25T since the start of A/D conversion period 2.

In the example shown in FIG. 7, at time TC6, the horizontal scanning circuit 210 switches the control signal BSEL_3 to low level, thereby canceling the selection of the output circuit 208_3. At time TC6, the horizontal scanning circuit 210 switches a control signal BSEL_4 to high level, thereby selecting an output circuit 208_4. After that, prohibition period 2 starts at time TC7 and thus the horizontal scanning circuit 210 does not change the selection of the output circuit 208. More specifically, the horizontal scanning circuit 210 maintains the selected state of the output circuit 208_4.

At time TC8, prohibition period 2 ends. After that, at time TC9, the horizontal scanning circuit 210 switches the control signal BSEL_4 to low level, thereby canceling the selection of the output circuit 208_4. In the above-described example, time T07a at which the S signal data is confirmed with respect to the OB pixel circuit 201a is included in prohibition period 2.

The selection of the output circuit 208 may be changed so that the A/D conversion operations for the N signal and the S signal are similarly influenced by a power fluctuation. For example, a time (TC2 to T02) from the start of A/D conversion period 1 until the selection of the output circuit 208 is changed last before the start of prohibition period 1 may be equal to a time (TC6-T06) from the start of A/D conversion period 2 until the selection of the output circuit 208 is changed last before the start of prohibition period 2.

As described above, according to this embodiment, the influence of the change of the selection of the output circuit 208 on A/D conversion can be reduced. This improves the accuracy of A/D conversion.

By causing the comparator 301 to hold an offset before A/D conversion period 1, a timing of changing the comparison signal COMP to low level in A/D conversion of the N signal may be controlled. This operation is called an auto-zero operation. For example, in an arrangement shown in FIG. 2 in Japanese Patent Laid-Open No. 2021-64859, an offset may be given to each of a plurality of comparators 301 by an operation during a period from time t1 to time t12 in FIG. 3 in the patent literature, and held in each of the plurality of comparators 301. In this case, in A/D conversion of the N signal, a timing of changing the comparison signal COMP to low level is typically set around the center of A/D conversion period 1. Therefore, as in this embodiment, prohibition period 1 is set around the center of A/D conversion period 1 (prohibition period 1 is set to a period until 0.65T elapses after a lapse of 0.35T since the start where T represents the length of the A/D conversion period). This makes it easy to obtain the effect of this embodiment. By setting, as prohibition period 1, a period until 0.75T elapses after a lapse of 0.25T since the start of A/D conversion period 1, it is possible to make it difficult for the operation of changing the selection of the output circuit from the plurality of output circuits 208 to overlap the timing of changing the comparison signal COMP to low level.

Second Embodiment

The first embodiment has explained the case in which the photoelectric conversion apparatus 101 operates in an operation mode of reading out data from all the memory circuits 205. This operation mode will be referred to as an entire memory mode. In the second embodiment, instead of or in addition to the entire memory mode, a photoelectric conversion apparatus 101 can operate in an operation mode of reading out data only from some memory circuits 205. The operation mode in which the number of selected output circuits 208 is small will be referred to as a partial memory mode hereinafter. For example, if signals of adjacent pixel columns are binned and read out or if signals are read out only from some pixel columns (that is, in the case of cropping and reading), the photoelectric conversion apparatus 101 operates in the partial memory mode.

Figure 8:
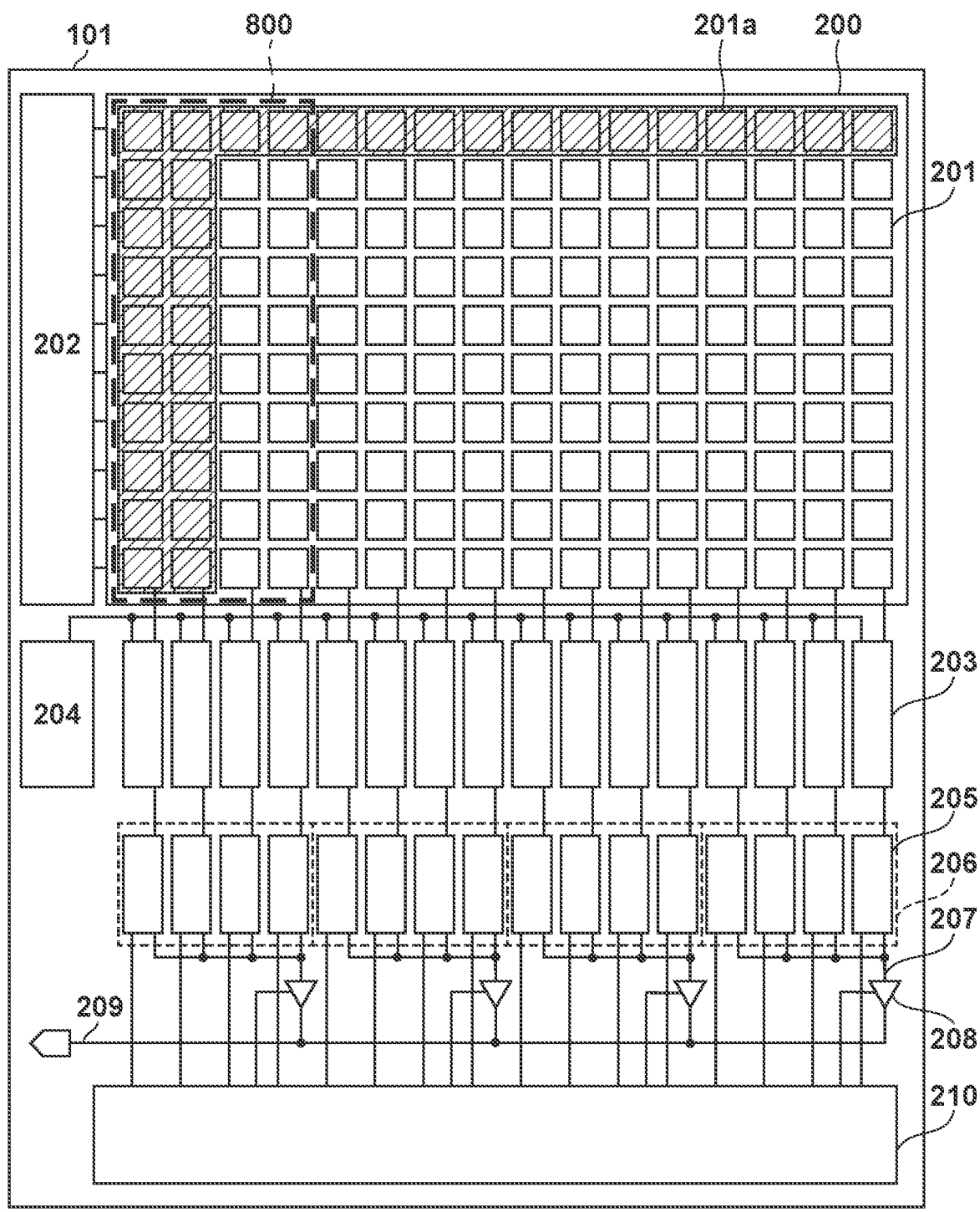
FIG. 8 is a block diagram showing an example of the arrangement of a photoelectric conversion apparatus according to a second embodiment.

As an example of the partial memory mode, a case in which pixel signals are read out, by a cropping and reading operation, only from pixel circuits 201 of 10 rows×4 columns included in a region 800 shown in FIG. 8 among a plurality of pixel circuits 201 will be described. FIG. 8 is a view obtained by adding a description of the region 800 to the photoelectric conversion apparatus 101 shown in FIG. 2. In this example, only the memory circuits 205 (more specifically, memory circuits 205_1 to 205_4) corresponding to the pixel circuits 201 included in the region 800 are used, and the remaining memory circuits 205 (more specifically, memory circuits 205_5 to 205_16) are not used.

Figure 9:
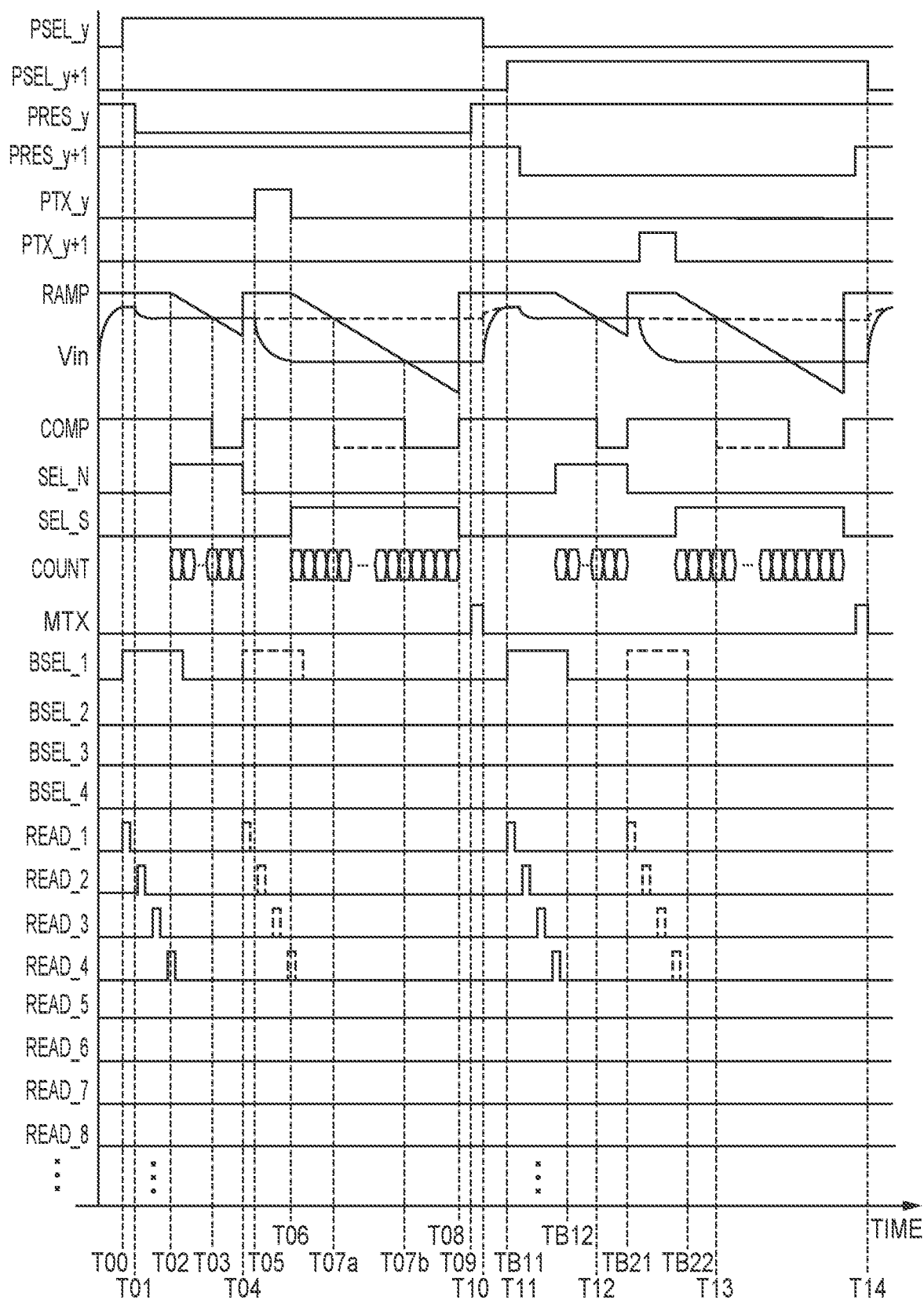
FIG. 9 is a timing chart showing details of an example of the operation of the photoelectric conversion apparatus according to the second embodiment.

The operation of the photoelectric conversion apparatus 101 in the entire memory mode is the same as that described with reference to FIG. 6. The operation of the photoelectric conversion apparatus 101 in the partial memory mode will be described with reference to FIG. 9. A description of parts common to FIG. 6 will be omitted. In this example, the memory circuits 205 included in memory blocks 206_2 to 206_4 are not selected. Therefore, a horizontal scanning circuit 210 maintains control signals BSEL_2 to BSEL_4 and READ_5 to READ 16 at low level. In the partial memory mode, the number of operations of changing the selection of the output circuit 208 is smaller than in the entire memory mode. Thus, a prohibit period during which the change of the selection of the output circuit 208 is prohibited can be set long.

Figure 10:
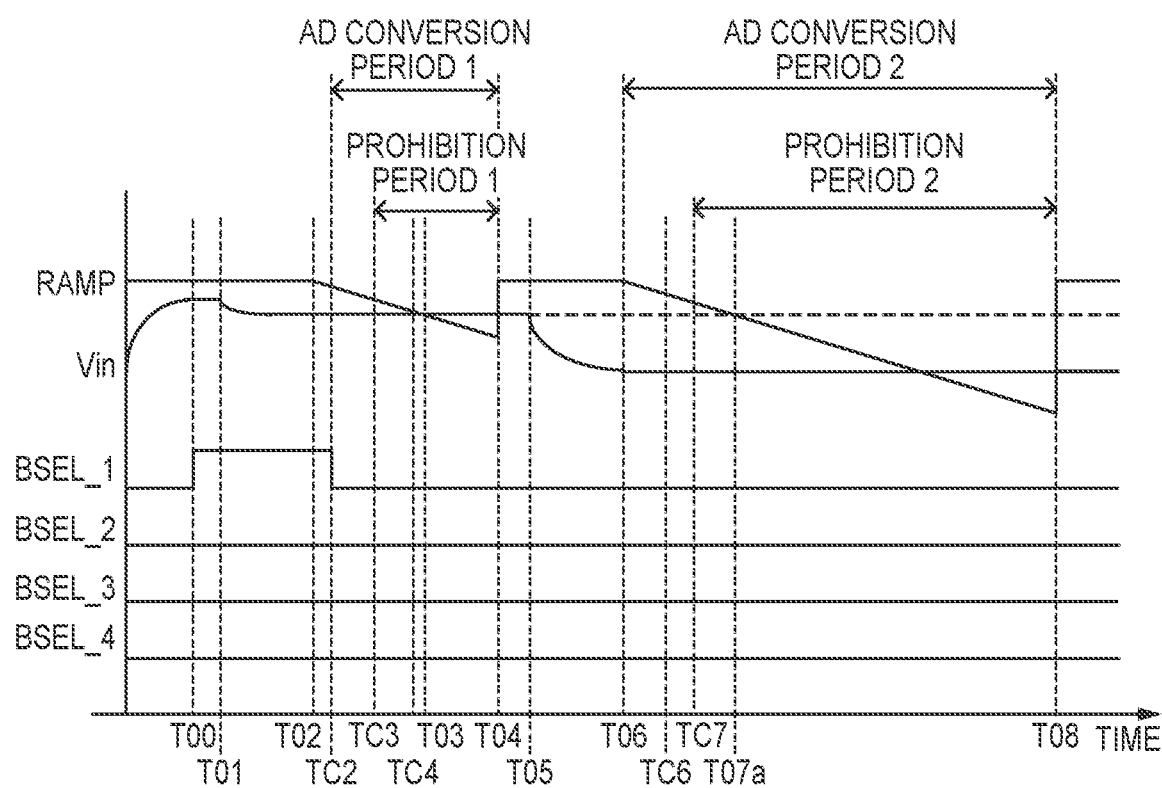
FIG. 10 is a timing chart showing details of the example of the operation of the photoelectric conversion apparatus according to the second embodiment.

Details of the operation of the horizontal scanning circuit 210 will be described with reference to FIG. 10. FIG. 10 is a timing chart obtained by paying attention to some signals and a partial period of the timing chart shown in FIG. 9. The start of prohibition period 1 in the partial memory mode may coincide with the start of prohibition period 1 in the entire memory mode. On the other hand, the end of prohibition period 1 in the partial memory mode may be later than the end of prohibition period 1 in the entire memory mode. That is, prohibition period 1 in the partial memory mode is longer than prohibition period 1 in the entire memory mode. Prohibition period 1 in the partial memory mode may continue until the end of A/D conversion period 1.

The start of prohibition period 2 in the partial memory mode may coincide with the start of prohibition period 2 in the entire memory mode. On the other hand, the end of prohibition period 2 in the partial memory mode may be later than the end of prohibition period 2 in the entire memory mode. That is, prohibition period 2 in the partial memory mode is longer than prohibition period 2 in the entire memory mode. Prohibition period 2 in the partial memory mode may continue until the end of A/D conversion period 2. In the example shown in FIG. 10, an output circuit 208_1 is selected before prohibition period 1. The output circuit 208_1 may be selected in another period such as a period indicated by a broken line in FIG. 9.

Other Embodiments

Figure 11A:
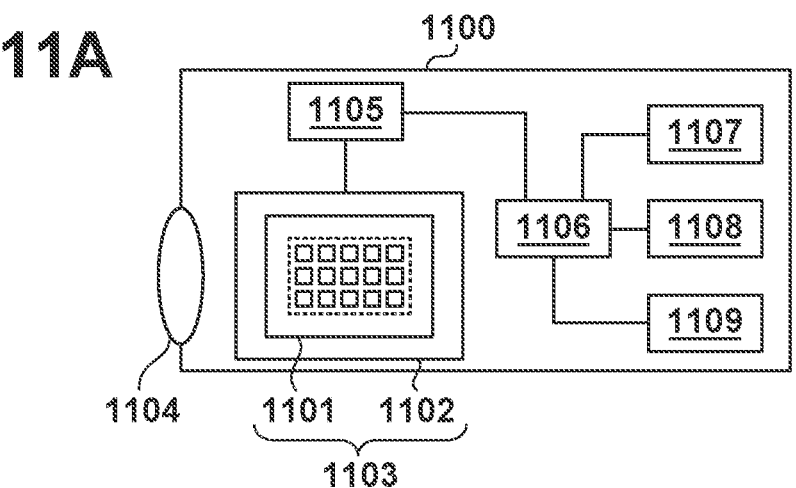
FIGS. 11A to 11C are views showing arrangement examples according to other embodiments.

An embodiment of equipment 1100 including a semiconductor apparatus 1103 will be described in detail with reference to FIG. 11A. The semiconductor apparatus 1103 may be a photoelectric conversion apparatus according to any one of the above-described embodiments. The semiconductor apparatus 1103 may include a semiconductor device 1101 and a package 1102 accommodating the semiconductor device 1101. The package 1102 may include a base on which the semiconductor device 1101 is fixed and a cover made of a glass or the like facing the semiconductor device 1101. The package 1102 may further include a connection member such as a bonding wire and bump for connecting a terminal of the base and a terminal (bonding pad) of the semiconductor device 1101.

The equipment 1100 may include at least one of an optical apparatus 1104, a control apparatus 1105, a processing apparatus 1106, a display apparatus 1107, a storage apparatus 1108, or a mechanical apparatus 1109. The optical apparatus 1104 is implemented by, for example, a lens, a shutter, and a mirror. The control apparatus 1105 controls the semiconductor apparatus 1103. The control apparatus 1105 is, for example, a semiconductor apparatus such as a Field Programmable Gate Array (FPGA) or an Application Specific Integrated Circuit (ASIC).

The processing apparatus 1106 processes a signal output from the semiconductor apparatus 1103. The processing apparatus 1106 is a semiconductor apparatus such as a Central Processing Unit (CPU) or an ASIC for forming an Analog Front End (AFE) or a Digital Front End (DFE). The display apparatus 1107 is an Electro-Luminescence (EL) display apparatus or a liquid crystal display apparatus that displays information (image) obtained by the semiconductor apparatus 1103. The storage apparatus 1108 is a magnetic device or a semiconductor device that stores the information (image) obtained by the semiconductor apparatus 1103. The storage apparatus 1108 is a volatile memory such as a Static Random Access Memory (SRAM) or a Dynamic Random Access Memory (DRAM) or a nonvolatile memory such as a flash memory or a hard disk drive.

The mechanical apparatus 1109 includes a moving or propulsion unit such as a motor or an engine. In the equipment 1100, the mechanical apparatus 1109 displays the signal output from the semiconductor apparatus 1103 on the display apparatus 1107 and performs external transmission by a communication apparatus (not shown) of the equipment 1100. To do this, the equipment 1100 may further include the storage apparatus 1108 and the processing apparatus 1106 in addition to the memory circuits and arithmetic circuits included in the semiconductor apparatus 1103. The mechanical apparatus 1109 may be controlled based on the signal output from the semiconductor apparatus 1103.

In addition, the equipment 1100 is suitable for an electronic equipment such as an information terminal (for example, a smartphone or a wearable terminal) which has an imaging function or a camera (for example, an interchangeable lens camera, a compact camera, a video camera, or a monitoring camera). The mechanical apparatus 1109 in the camera may drive the components of the optical apparatus 1104 in order to perform zooming, an in-focus operation, and a shutter operation. Alternatively, the mechanical apparatus 1109 in the camera may move the semiconductor apparatus 1103 in order to perform an anti-vibration operation.

Furthermore, the equipment 1100 can be a transportation equipment such as a vehicle, a ship, or an airplane. The mechanical apparatus 1109 in a transportation equipment can be used as a moving apparatus. The equipment 1100 as a transportation equipment may be used as equipment that transports the semiconductor apparatus 1103 or equipment that uses an imaging function to assist and/or automate driving (steering). The processing apparatus 1106 for assisting and/or automating driving (steering) may perform, based on the information obtained by the semiconductor apparatus 1103, processing for operating the mechanical apparatus 1109 as a moving apparatus. Alternatively, the equipment 1100 may be a medical equipment such as an endoscope, a measurement equipment such as an analysis distance measurement sensor, an analysis equipment such as an electron microscope, or an office equipment such as a copy machine.

Figure 11B:
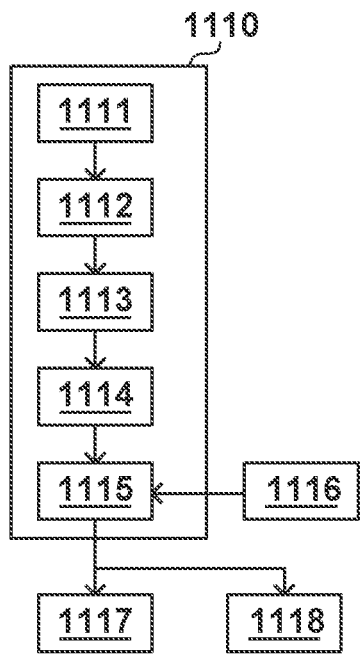
Figure 11C:
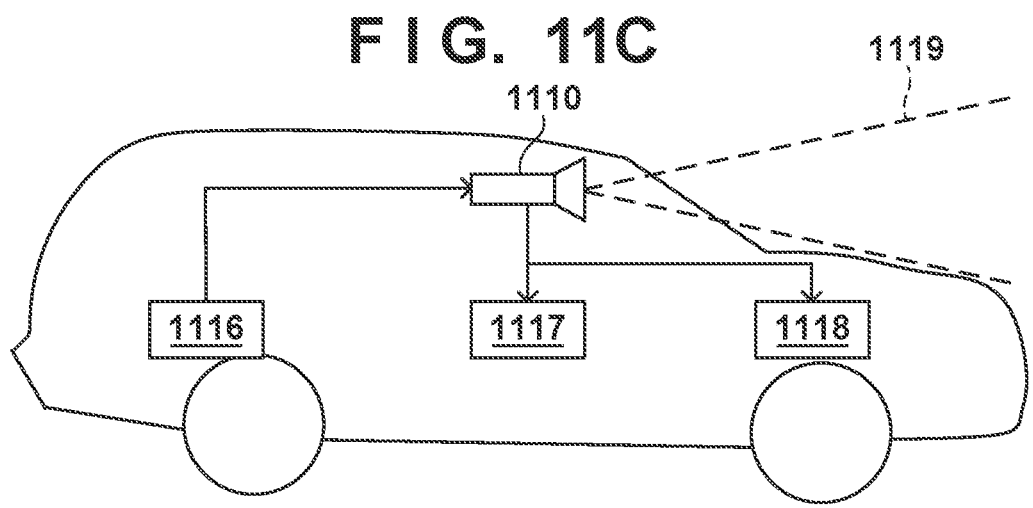

An embodiment of an image capturing system and a moving body will be described with reference to FIGS. 11B and 11C. FIG. 11B shows an example of an image capturing system 1110 concerning an in-vehicle camera. The image capturing system 1110 includes a photoelectric conversion apparatus 1111. The photoelectric conversion apparatus 1111 may be any one of the photoelectric conversion apparatuses described in the above embodiments. The image capturing system 1110 includes an image processing unit 1112 as a processing apparatus that performs image processing for a plurality of image data acquired by the photoelectric conversion apparatus 1111. The image capturing system 1110 also includes a parallax acquisition unit 1113 as a processing apparatus that calculates a parallax (the phase difference of a parallax image) from the plurality of image data acquired by the photoelectric conversion apparatus 1111. In addition, the image capturing system 1110 includes a distance acquisition unit 1114 as a processing apparatus that calculates the distance to a target object based on the calculated parallax, and a collision determination unit 1115 as a processing apparatus that determines based on the calculated distance whether there is a collision possibility. In this example, the parallax acquisition unit 1113 and the distance acquisition unit 1114 are examples of an information acquisition unit that acquires information such as distance information to a target object. That is, the distance information is information about a parallax, a defocus amount, a distance to a target object, or the like. The collision determination unit 1115 may determine the collision possibility using one of these pieces of distance information. Each of the above-described various kinds of processing apparatuses may be implemented by specially designed hardware or by general-purpose hardware for performing arithmetic processing based on a software module. Alternatively, each processing apparatus may be implemented by an FPGA, an ASIC, or the like or by a combination thereof.

The image capturing system 1110 is connected to a vehicle information acquisition apparatus 1116, and can acquire vehicle information such as a vehicle speed, a yaw rate, and a steering angle. The image capturing system 1110 is connected to a control ECU 1117 as a control apparatus that outputs a control signal to generate a braking force to the vehicle based on the determination result of the collision determination unit 1115. That is, the control ECU 1117 is an example of a moving body control unit that controls a moving body based on distance information. The image capturing system 1110 is also connected to an alarming device 1118 that generates an alarm to the driver based on the determination result of the collision determination unit 1115. For example, if the collision possibility is high as the determination result of the collision determination unit 1115, the control ECU 1117 performs vehicle control to avoid a collision or reduce damage by, for example, applying the brake, returning the accelerator, or suppressing the engine output. The alarming device 1118 warns the user by, for example, generating an alarm sound or the like, displaying alarming information on the screen of a car navigation system or the like, or giving a vibration to a seat belt or steering wheel.

In this embodiment, the image capturing system 1110 captures the periphery, for example, the front or rear of the vehicle. FIG. 11C shows the image capturing system 1110 in a case in which the front of the vehicle (image capturing range 1119) is captured. The vehicle information acquisition apparatus 1116 sends an instruction to operate the image capturing system 1110 and execute image capturing.

An example in which control is performed not to cause a collision against another vehicle has been described above. However, the image capturing system can also be applied to control for automated driving following another vehicle or automated driving without deviation from a lane. Furthermore, the image capturing system can be applied not only to a vehicle such as an automobile but also to, for example, a moving body (transportation equipment) such as a ship, an airplane, or an industrial robot. The moving apparatus in the moving body (transportation equipment) includes various kinds of moving units such as an engine, motor, wheels, and propellers. In addition, the image capturing system can also be applied not only to the moving body but also to equipment that widely uses object recognition, such as Intelligent Transport Systems (ITS).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201993, filed Dec. 13, 2021, which is hereby incorporated by reference herein in its entirety.

What is claimed is:

1. A photoelectric conversion apparatus comprising:
a plurality of pixel circuits;
a plurality of A/D conversion circuits configured to generate digital data by A/D-converting, during an A/D conversion period, analog signals read out from the plurality of pixel circuits;
a plurality of memory circuits configured to store the digital data generated by the plurality of A/D conversion circuits;
a plurality of output circuits each connected to at least two memory circuits among the plurality of memory circuits; and
a scanning circuit configured to select one of the plurality of output circuits, and select one of the at least two memory circuits connected to the selected output circuit, thereby reading out, to an output line, the digital data stored in the selected memory circuit,
wherein the scanning circuit is configured not to change the selection of the output circuit from the plurality of output circuits during a prohibition period including at least a period until 0.65T elapses after a lapse of 0.35T since a start of the A/D conversion period where T represents a length of the A/D conversion period.

2. The apparatus according to claim 1, wherein the scanning circuit is configured to change the selection of the output circuit from the plurality of output circuits during a period of the A/D conversion period, which is not included in the prohibition period.

3. The apparatus according to claim 1, wherein the scanning circuit is configured to change the selection of the output circuit from the plurality of output circuits during a period from the start of the A/D conversion period to a start of the prohibition period.

4. The apparatus according to claim 1, wherein a length of the prohibition period is shorter than the length of the A/D conversion period.

5. The apparatus according to claim 1, wherein the plurality of A/D conversion circuits are configure to
A/D-convert, during a first A/D conversion period, first analog signals read out from the plurality of pixel circuits in a reset state, and
A/D-convert, during a second A/D conversion period, second analog signals read out from the plurality of pixel circuits in a state in which charges corresponding to incident light are accumulated,
the A/D conversion period is the first A/D conversion period, and
the scanning circuit is configured not to change the selection of the output circuit from the plurality of output circuits during a first prohibition period including at least a period until 0.65T elapses after a lapse of 0.35T since a start of the first A/D conversion period where T represents a length of the first A/D conversion period.

6. The apparatus according to claim 5, wherein the scanning circuit is configured not to change the selection of the output circuit from the plurality of output circuits during a second prohibition period including at least a period until 0.65T elapses after a lapse of 0.35T since a start of the second A/D conversion period where T represents the length of the first A/D conversion period.

7. The apparatus according to claim 6, wherein a time from the start of the first A/D conversion period until the selection of the output circuit from the plurality of output circuits is changed last before the start of the first prohibition period is equal to a time from the start of the second A/D conversion period until the selection of the output circuit from the plurality of output circuits is changed last before the start of the second prohibition period.

8. The apparatus according to claim 6, wherein
the photoelectric conversion apparatus is capable of operating in a first operation mode, and a second operation mode in which a number of output circuits selected from the plurality of output circuits is smaller than in the first operation mode, and
the second prohibition period in the second operation mode is longer than the second prohibition period in the first operation mode.

9. The apparatus according to claim 8, wherein in the second operation mode, the first prohibition period continues until an end of the first A/D conversion period, and the second prohibition period continues until an end of the second A/D conversion period.

10. The apparatus according to claim 1, wherein the prohibition period is a period from a start to an end of the A/D conversion period.

11. The apparatus according to claim 1, wherein the prohibition period is a period including at least a period until 0.75T elapses after a lapse of 0.25T since the start of the A/D conversion period.

12. The apparatus according to claim 1, wherein
each A/D conversion circuit includes a comparator configured to receive a ramp signal and output a signal indicating a comparison result between the ramp signal and the analog signal, and
the A/D conversion period is a period from a start of a change of a voltage level of the ramp signal to an end of the change.

13. The apparatus according to claim 12, wherein the comparator holds an offset before the A/D conversion period.

14. Equipment comprising:
a photoelectric conversion apparatus according to claim 1; and
at least one of
an optical apparatus corresponding to the photoelectric conversion apparatus,
a control apparatus configured to control the photoelectric conversion apparatus,
a processing apparatus configured to process a signal output from the photoelectric conversion apparatus,
a display apparatus configured to display information obtained by the photoelectric conversion apparatus,
a storage apparatus configured to store the information obtained by the photoelectric conversion apparatus, or
a mechanical apparatus configured to operate based on the information obtained by the photoelectric conversion apparatus.

* * * * *